Figure 4:
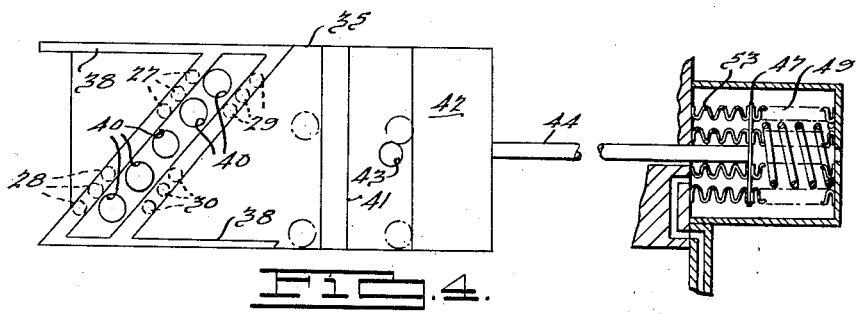
Figure 5:
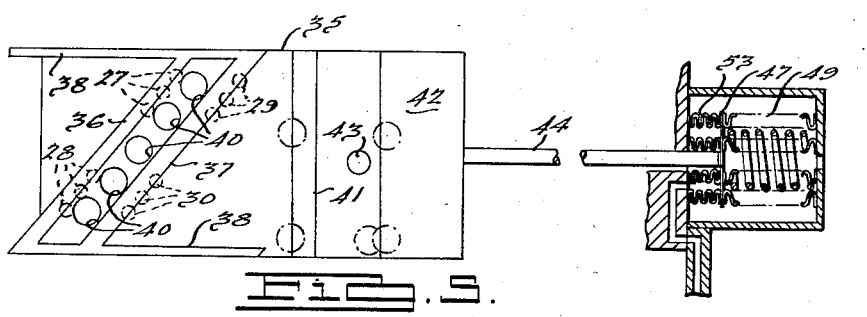

Sept. 5, 1950 P. W. WYCKOFF 2,521,557
APPARATUS FOR SUCCESSIVELY MAKING
APPROXIMATE AND FINAL ADJUSTMENTS
Original Filed June 14, 1946 3 Sheets-Sheet 1
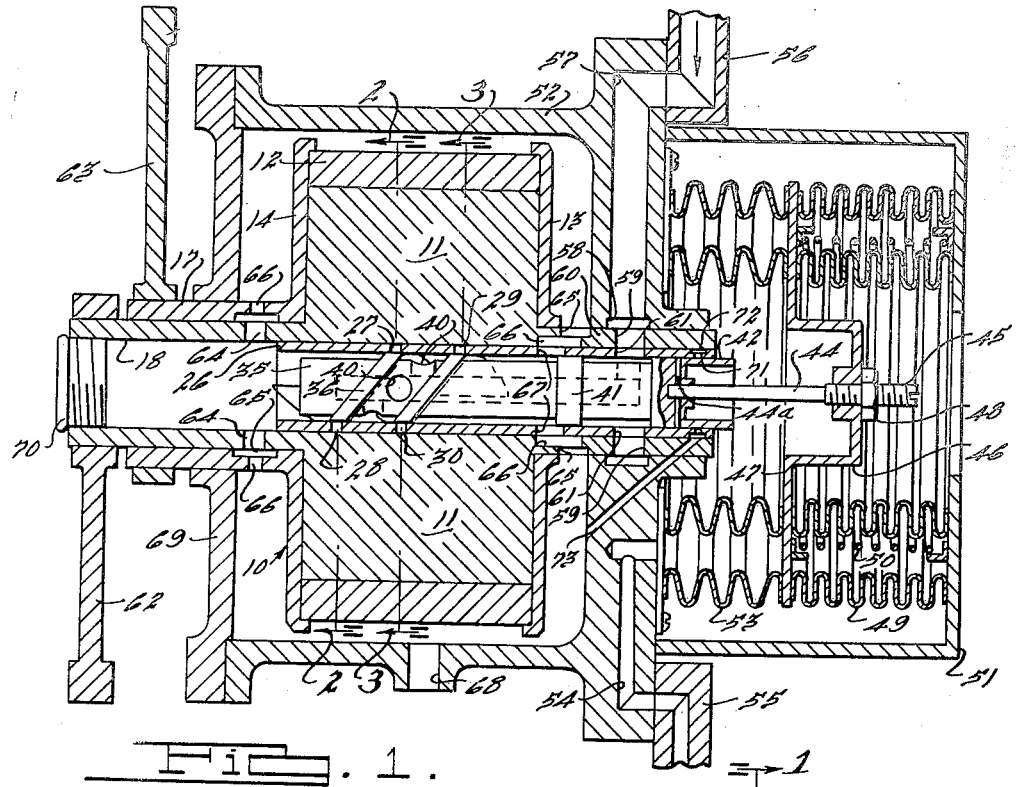
INVENTOR.
Paul W. Wyckoff
BY
Harness and Harris
ATTORNEYS.

Sept. 5, 1950 P. W. WYCKOFF 2,521,557
APPARATUS FOR SUCCESSIVELY MAKING
APPROXIMATE AND FINAL ADJUSTMENTS
Original Filed June 14, 1946 3 Sheets-Sheet 2

INVENTOR.
Paul W. Wyckoff
BY
Harness and Harris
ATTORNEYS.

Sept. 5, 1950  P. W. WYCKOFF  2,521,557
APPARATUS FOR SUCCESSIVELY MAKING
APPROXIMATE AND FINAL ADJUSTMENTS
Original Filed June 14, 1946  3 Sheets-Sheet 3

INVENTOR.
Paul W. Wyckoff.
BY
Harness and Harris
ATTORNEYS

Patented Sept. 5, 1950

2,521,557

UNITED STATES PATENT OFFICE 2,521,557

APPARATUS FOR SUCCESSIVELY MAKING APPROXIMATE AND FINAL ADJUSTMENTS

Paul W. Wyckoff, Dayton, Ohio, assignor to Chrysler Corporation, Highland Park, Mich., a corporation of Delaware Continuation of application Serial No. 676,809, June 14, 1946. This application April 7, 1948, Serial No. 19,517

13 Claims. (Cl. 121—41)

1

This application is a continuation of application Serial No. 676,809, filed June 14, 1946, now abandoned, and relates to a control apparatus and more specifically to an apparatus by which a control device determining a certain desired condition is brought to an approximate position determining such condition and is then adjusted accurately to final position for such condition.

In my copending application Serial No. 516,859, now U. S. Patent 2,463,931, I disclose and claim a control apparatus comprising a housing, a vane contained therein, and valve means that controls the admission of pressure fluid between the vane and the housing so as to hold the vane against movement with respect to the housing and to adjust the vane with respect to the housing. According to my copending application, the housing may be adjusted to various positions representing desired values of a condition such as pressure in a line and the vane may be connected to a regulator such as a spill valve in the line so that adjustment of the housing to a new position causes the pressure fluid between the vane and the housing to bring the vane first to a new approximate position and then to a new final position causing the regulator to produce a desired value of the condition.

According to the present application the arrangement of vane and housing is reversed; that is, the vane may be manually adjusted to various positions representing desired values of the condition, and the housing is connected to the regulator. This arrangement makes it possible for one part of the valve means to be directly connected to the vane and rotatable with it, and simplification and compactness of the entire apparatus are achieved.

Further, according to the present application, the valve means is composed of a rotary or angularly movable part and a linearly movable part. The rotary valve part is attached to the vane. The linearly movable valve part is attached to a linearly movable condition-sensing device, such as a bellows.

In the drawing:

Fig. 1 is a sectional view taken on line 1—1 of Fig. 3, showing the control apparatus forming the subject matter of the present invention;

Figs. 2 and 3 are transverse sectional views taken on the lines 2—2 and 3—3 of Fig. 1, respectively;

Figs. 4-8, inclusive, are developed diagrammatic views of the valve parts of the control apparatus in different relative positions; and

2

Figure 9:
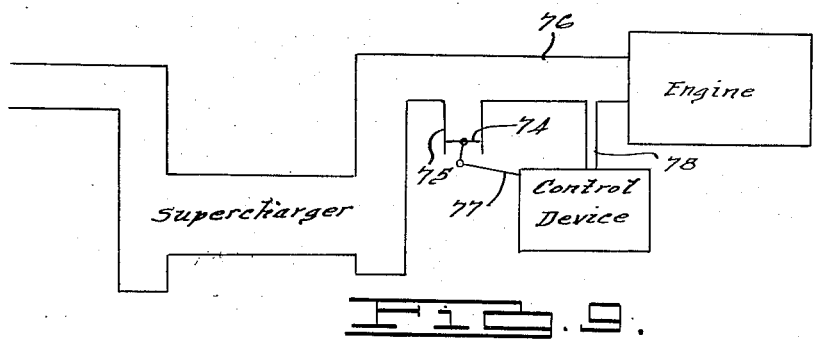

Fig. 9 shows the application of the control apparatus of the present invention to a spill valve in a line between a supercharger and an engine.

The control apparatus of the present invention comprises essentially an angularly movable or rotatable housing 10 and a vane 11 mounted in the housing 10 for angular movement or rotation with respect thereto, as shown in Figs. 1, 2, and 3. The housing 10 is composed of a tubular part 12, an end piece 13 at the right as viewed in Fig. 1, an end piece 14 at the left, and members 15 and 16 dividing the housing into chambers. The aforesaid parts of the housing 10 are fixed against relative movement with respect to one another. The end piece 14 has a sleeve-like extension 17, which embraces a tubular extension 18 of the vane 11. At one region of its length, as indicated by Fig. 2, the member 15 has a recess 19 extending from its lower face, and the member 16 has a recess 20 extending from its upper face. At another region of its length as indicated by Fig. 3, the member 15 has a recess 21 extending from its lower face, and the member 16 has a recess 22 extending from its lower face. The members 15 and 16 have beveled portions 23 at the outer regions, which receive widened ends 24 of vane 11. The vane has a hub 25, in which is press-fitted a sleeve 26, which has four sets of openings 27, 28, 29, and 30. The openings 27 and 28 are on one spiral, and the openings 29 and 30, on another spiral. For the sake of convenience, openings 27 and 28 are shown in the transverse plane of Fig. 2, and the openings 29 and 30, in the transverse plane of Fig. 3. The openings are correctly shown in spaced diagonal lines in the developed views of Figs. 4–9, inclusive. At the section of Fig. 2 a large opening 31 extends through the hub 25 from the openings 27 to the lower left side of vane 11, and a large opening 32 extends through the hub 25 from the openings 28 to the upper right side of the vane 11. At the section of Fig. 3 a large opening 33 extends through the hub 25 from the openings 29 to the lower right side of the vane 11, and a large opening 34 extends through the hub 25 from the openings 30 to the upper left side of the vane 11. The sleeve 26 constitutes a rotating valve part of valve means of which the cooperating valve part is a reciprocal tubular member 35. The member 35 has spiral lands 36 and 37 and an axial land 38. Between the lands 36 and 37 is a spirally arranged set of openings 40. At an intermediate region of the reciprocal valve member 35 is a circular land 41, and the right end of the member 35 is enlarged as indicated at 42. The lands 36, 37, 38, 41 and the enlarged right end portion 42 have a tight fit within the sleeve 26, but the sleeve 26 and tubular member 35 are capable of relative axial and angular movement. A fluid-admitting opening 43 is located between the land 41 and the right end portion 42.

The left end of the rod 44 and a pin 44ª going through the left are embedded in the right end of the tubular member 35, so that relative axial movement and angular movement between rod and tubular member are prevented. A threaded portion 45 at the other end of the rod 44 is adjustably connected to a cupped central portion 46 of a plate 47. A nut 48 fixes the rod 44 to the plate 47. The plate 47 is connected to one end of a vacuum bellows 49 having a spring 50 therein preventing collapse of the bellows. The other end of the bellows is connected to a member 51, secured to a casing 52. The plate 47 is also connected to one end of a bellows 53, subjected to a variable pressure such as engine manifold pressure through a passage 54 in the casing 52 and a fitting 55. Fluid under pressure is received by way of a fitting 56 and a passage 57 in the casing 52, and is passed through an internal annular groove 58 in a bore in the casing 52 and through openings 59 in a tubular member 60 press-fitted in the housing and piece 13 received in the bore in the casing 52 and through openings 61 in the tubular valve 26 to the space between the land 41 and the enlarged right end portion on the tubular valve member 35, whence it passes through the opening 43 to the interior of the valve member 35 for a purpose to be described presently.

A manually operable lever 62 is secured to the tubular extension 18 of the vane 11. A lever 63 is secured to the tubular extension 17 of the end piece 14 of the housing 10 and is adapted to be connected to a gas-pressure control such as a carburetor throttle. The tubular extension 18 has drain openings 64, and the tubular extension 17 has an annular groove 65 and drain openings 66 communicating with the drain openings 64.

The tubular extension 69 on the vane 11 has openings 65 and an internal annular groove 66 communicating with openings 67 in the tubular valve part 26. There is a drain opening 68 in the bottom of the casing 52. The left end of the housing is supported by journalling of its tubular extension 17 on a closure piece 69 of the casing 52. The other end of the housing is supported on the tubular extension 60 of the vane 11, which is in turn journalled in the casing 52.

In the position of Fig. 4 the valve parts 26 and 35 are so positioned that the spiral lands 36 and 37 on the valve part 35 cover the openings 27, 28, 29, 30, and thus pressure fluid coming through the openings 40 in the valve part 35 cannot pass to the chambers formed between the vane 11 and the housing 10. Likewise, fluid already present within the housing between the housing and the vane cannot escape, because exit for the fluid through the openings 27, 28, 29, 30 is blocked by the lands 36 and 37. Thus the vane 11 and housing 10 are locked against relative movement. The manual lever 62 is set for a certain manifold pressure. The carburetor throttle lever 63 produces the certain manifold pressure, which is supplied to the bellows 53 through the fitting 55 and the passage 54, causing the reciprocal tubular valve part 35 to be positioned with respect to the rotatable valve part 26 fitted in the vane 11 that the lands 36 and 37 close the openings 27, 28, 29, 30 to entrance or escape of fluid from the housing 10.

Suppose now that there is a decrease in manifold pressure, because the plane propelled by the engine associated with the carburetor throttle mentioned gains altitude. This is reflected in collapsing of the bellows 53 and a movement to the left of plate 47. Reciprocal valve part 35, being connected with the plate 47 through the rod 44, also moves to the left and assumes the position with respect to the rotatable valve part 26 illustrated in Fig. 5. The openings 27, 28, 29, 30 are at least partially uncovered by the lands 36 and 37, the openings 27, 28 receiving pressure fluid from the openings 40, and the openings 29, 30 being enabled to discharge fluid through the drain openings 67. The fluid lock of the vane 11 in the housing 10 is broken. As seen in Fig. 2, pressure fluid passes through the openings 27 and 28 in the valve part 26 and thence through the openings 31 and 32 in the hub 25 of the vane 11 into the chambers between the housing 10 and the vane 11 to the left of the lower half of the vane and to the right of the upper half of the vane. As seen in Fig. 3, pressure fluid escapes from the chambers to the right of the lower end of the vane and to the left of the upper end of the vane through the openings 33 and 34 in the hub 25 of the vane 11 and the openings 29 and 30 in the valve part 26 and thence along the exterior of the valve part 35 and out through the openings in the valve part 26 to drain. The vane 11 is held against movement by its connection with the manual control lever 62, and so the housing 10 moves in a counterclockwise direction as viewed in Figs. 2 and 3, causing the lever 63 to move with it and thereby to adjust the carburetor throttle to the point where the manifold pressure will be returned to the valve for which the manual control lever 62 is set. When this occurs, the bellows 53 will return to its original position, moving the valve part 35 to the right back to the relative position with respect to the valve part 26 shown in Fig. 4, in which position the lands 36 and 37 cover the openings 27, 28, 29, 30. Now fluid can neither enter nor escape from the housing 10, and the housing and vane 11 are locked by the fluid against relative movement.

If the manifold pressure rises above the value for which the manual control lever 62 is set, the bellows 53 expands causing the plate 47 and the valve part 35 to move to the right. The relative position assumed by the valve parts 26 and 35 is not shown, but it can be pictured. The lands 36 and 37 and the openings 40 move to the right, causing the openings 29 and 30 to receive pressure fluid from the openings 40 and the openings 27 and 28 to be connected to drain through the openings 64 and 66 and the groove 65. As seen in Fig. 3, the pressure fluid passes through the openings 29 and 30 in the tubular valve part 26 and through the openings 33 and 34 in the vane hub 25 to the chambers on the housing 10 to the left of the upper end of the vane 11 and to the right of the lower end of the vane 11. As seen in Fig. 2, fluid in the chambers in the housing 10 to the right of the upper end of the vane 11 and to the left of the lower end of the vane 11 drains through the openings 31 and 32 in the vane hub and the openings 27 and 28 in the tubular valve part 26 and thence along the exterior of and beyond the left end of the tubular valve part 35 to the drain openings 64 and 66. Thus the housing 10 is caused to rotate with respect to the fixed vane 11 in a clockwise direction as viewed in Figs. 2 and 3. Thus the lever 63 is rotated so as to adjust the carburetor throttle to restore the manifold pressure to the value for which the manual control lever 62 is set. When this happens, the valve parts 26 and 35 return to the relative position of Fig. 4, and the vane 11 and housing 10 are locked against relative movement by the fluid within the housing.

Figure 6:
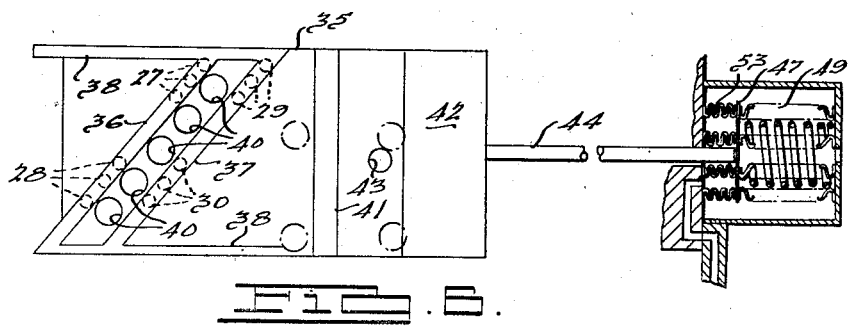
Figure 7:
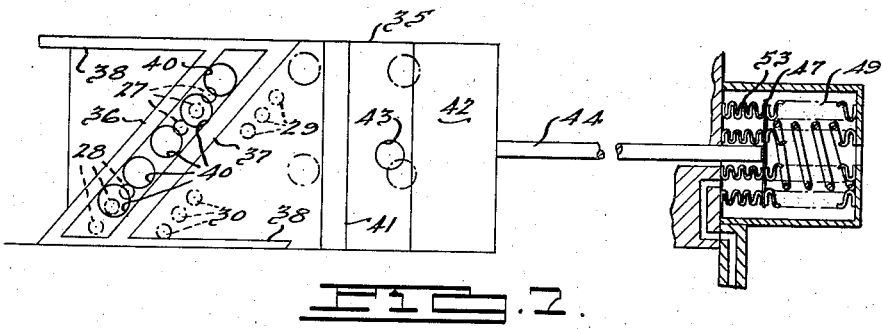
Figure 8:
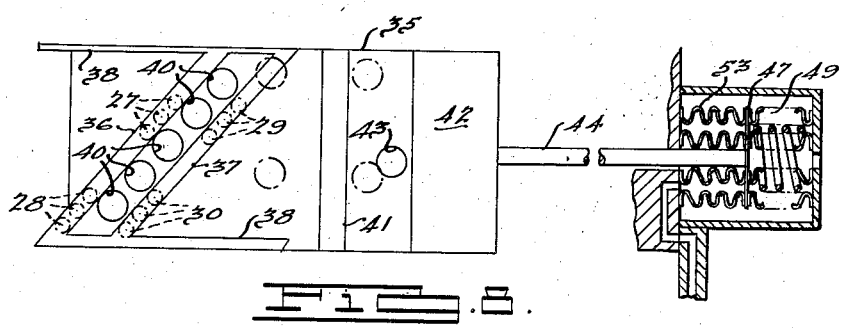

Fig. 4 shows the valve parts 26 and 35 in relative position for an intermediate manifold pressure. Fig. 6 shows the valve parts in relative position for a relatively low manifold pressure. If now a higher manifold pressure is desired, the manual control lever 62 is shifted to rotate the vane 11 in a counterclockwise direction as viewed in Figs. 2 and 3. The fluid lock between the vane 11 and the housing 10 causes the housing and the lever 63 also to be shifted in a counterclockwise direction. It is to be noted that a complete fluid lock between vane and housing is operable through only a few degrees of relative angular movement between tubular sleeve 26 and valve part 35; that is, until the valve openings 27, 28, 29, 30 move away from the position of registry in Fig. 6 with the lands 36 and 37. However, the fluid lock is at least partially effective while the lands 36, 37 partially close the openings 27, 28, 29, 30. Thus the lever 63 brings the carburetor throttle to a new approximate position for approximately producing the manifold pressure for which the manual control lever 62 is now set. Simultaneously with the above the valve part 26 is rotated with respect to the valve part 35 to the position shown in Fig. 7. In this position the openings 27 and 28 in the valve part 26 receive pressure fluid from the openings 40 in the valve part 35, and the openings 29 and 30 are connected to the drain openings 67. As seen in Fig. 2, the pressure fluid passes through openings 33 and 34 in the vane hub 25 to the chambers in the housing 10 to the left of the upper end of the vane 11 and to the right of the lower end of the vane 11. As seen in Fig. 3, fluid in the chambers to the left of the lower end of vane 11 and to the right of the upper end of vane 11 drains through openings 33 and 34 in the vane hub 25 and openings 29 and 30 in the tubular valve part 26. Thus the housing 10 is also rotated counterclockwise with respect to the vane 11 through action of the pressure fluid in addition to being rotated counterclockwise in an absolute sense by virtue of corresponding rotation of the vane 11 and the fluid lock initially existing between the vane 11 and the housing 10. When the predetermined higher manifold pressure is reached, that pressure acting upon the bellows 53 moves the plate 46 and the tubular valve part 26 to the right, and the spiral lands 36 and 37 are caused to cover the openings 27, 28, 29, 30, as indicated in Fig. 8. Thus the fluid lock of the vane 11 and the housing 10 is reestablished, and these parts are held against relative movement.

When a lower manifold pressure is desired, the vane 11 and housing 10 are shifted in a manner not shown but readily pictured. The manual control lever 62 is actuated to rotate the vane 11 in a clockwise direction as viewed in Figs. 2 and 3. The fluid lock between the vane and the housing 10 causes the housing also to be rotated clockwise, the housing moving the lever 63 so as to adjust the carburetor throttle for a new approximate position producing the new desired lower manifold pressure. Clockwise movement of the vane 11 will produce a similar movement of valve 26 as viewed in Figs. 2 and 3 or an upward movement of the openings 27, 28, 29, 30 in valve 26 from the position of Fig. 8. In the new position the openings 27, 28 and the openings 29, 30 will be above the land 36 and the land 37, respectively. The openings 29 and 30 receive pressure fluid through the openings 40 in the valve part 35, and this pressure fluid passes through the openings 33 and 34 of the vane hub 25 into the chambers to the lower left and the upper right of the vane 11, as viewed in Fig. 3. As viewed in Fig. 2, fluid from the chambers to the lower right and the upper left of the vane 11 escape through openings 31 and 32 in the vane hub 25 and openings 27 and 28 in the valve part 26 and thence along the exterior of the valve part 26 to drain through openings 64 and 66 and the groove 65. Thus the housing 10 is rotated clockwise with respect to the vane 11 through action of the pressure fluid in addition to being rotated clockwise in an absolute sense by virtue of corresponding rotation of the vane 11 and the fluid lock initially existing between the vane 11 and the housing 10. The aforesaid movement of the housing 10 causes the lever 63 to adjust the carburetor throttle, and when the new desired lower value of the manifold pressure is reached, collapsing of the bellows 53 will have caused the tubular valve part 35 to move to the left so that the valve parts 26 and 35 are in the relative position of Fig. 6, in which the lands 36 and 37 on the valve part 35 cover the openings 27, 28, 29, 30 and thereby create a fluid lock of the housing 10 and vane 11 by preventing fluid both from entering the housing and from escaping therefrom.

The end of the tubular extension 18 of the vane 11 is closed by a plug 70 so that fluid draining from the housing 10 through the openings 27 and 28 in the valve part 26 will not flow out the end of the tubular extension 18, but will instead flow through the openings 64 and 66 and the groove 65 and then out the opening 68 in the bottom of the casing 52.

There are provided in annular groove 71 and a plurality of openings 72 in the right end of the tubular valve part 26 and a downwardly sloping passage 73 in the tubular extension 60 of the vane 11 and in the right end of the casing 52, through which fluid moved to the right of the inlet passages 59 and 61 along the enlarged right end of the valve part 35 will escape into the casing 52 for drain through the opening 68 rather than onto the bellows 53.

As seen in Fig. 2, the recesses 19 and 20 are provided in the members 15 and 16 so that even when the housing 10 is rotated counterclockwise from the position shown in Fig. 2 to effect contact between the members 15 and 16 and the vane 11, pressure fluid may still enter between the vane 11 and the housing 10 by way of the openings 27 and 28 in the tubular valve part 26 and the openings 31 and 32 in the vane hub 25. As seen in Fig. 3, the recesses 21 and 22 are provided in the members 15 and 16 so that even when the housing 10 is rotated clockwise from the position of Fig. 3 to effect contact between the members 15 and 16 and the vane 11, pressure fluid may still enter between the vane 11 and the housing 10 by way of the openings 29 and 30 in the tubular valve part and the openings 33 and 34 in the vane hub 25.

The control device of the present invention is capable of many uses beside the one just shown and described. Fig. 9 shows it used for regulating the pressure in a line between a supercharger by means of a spill valve. The spill valve is designated by the numeral 74 and operates in an outlet 75 in a line 76 connecting the supercharger and the engine. The valve 74 is controlled by means 77 extending from the control device, and it is to be understood that this means will be connected to the lever 63. Pressure existing in the line 76 is transmitted through a line 78 to the bellows 53. The operation of the control device is as previously described.

I claim:

1. In combination, an outer containing member, an inner member contained within the outer containing member, fluid means for adjusting the outer containing member with respect to the inner contained member, valve means for causing the fluid means to produce the aforesaid adjustment and to hold the members against adjustment with respect to one another by a fluid lock, the fluid lock causing shifting of the inner contained member to a new position to adjust the outer containing member to an approximate new position, means connecting the valve means with the inner contained member for causing shifting thereof to its aforesaid position to break the fluid lock and to cause the fluid means to move the outer containing member to an accurate new position, and means responsive to assumption by the outer contained member of its accurate new position to cause the valve means again to provide a fluid lock of the members with respect to one another.

2. In combination, an angularly movable housing, a vane angularly movable within the housing, means for manually adjusting the vane to a new position, means for supplying fluid under pressure between the vane and housing to produce angular movement of the housing in one direction with respect to the vane, means for supplying fluid under pressure between the vane and housing to produce angular movement of the housing in the opposite direction with respect to the vane, a pair of cooperating valve parts blocking escape and entry of fluid under pressure between the housing and the vane by way of the aforesaid pair of supplying means for providing a fluid lock between the vane and the housing and thereby causing movement of the vane to its new position to bring the housing to an approximate new position, means connecting one valve part to the vane for causing movement of the vane to its new position to shift the said one valve part with respect to the other valve part for connecting one supplying means to a source of fluid under pressure and the other supplying means to drain to move the housing to a final new position, and means responsive to assumption by the housing of a final new position for repositioning of the valve parts with respect to one another for restoring the fluid lock of the vane in the housing.

3. In combination, an angularly movable vane, an angularly movable housing containing the vane and being adjustable with respect thereto, fluid means for adjusting the housing with respect to the vane, means forming a fluid lock between the housing and vane for preventing relative adjustment between them, means for manually shifting the vane to a new position and therewith shifting the means forming the fluid lock to bring the housing to an approximate new position, means responsive to shifting of the vane to break the fluid lock and to adjust the housing with respect to the vane to bring the housing to an accurate new position, and means responsive to assumption by the housing of its accurate new position to restore the fluid lock between the vane and the housing.

4. In combination, an angularly movable housing, an angularly movable vane mounted within the housing, means for manually moving the vane to a new position, a first valve part positioned within the vane for conjoint angular movement therewith about the axis of the vane, a second valve part mounted in the first valve part for straight-line movement with respect thereto, means for supplying pressure fluid between the vane and housing to produce angular movement of the housing in one direction with respect to the vane, means for supplying pressure fluid between the vane and housing to produce angular movement of the housing with respect to the vane in the opposite direction, the valve parts being relatively positionable to block escape and entry of pressure fluid between the housing and the vane for providing a fluid lock between the housing and vane and thereby causing movement of the vane to its said new position to bring the housing to an approximate new position, angular movement of the vane to its said position producing angular movement of the first valve part with respect to the second valve part causing one supplying means to be connected to a source of pressure fluid and the other supplying means to be connected to drain for angularly moving the housing to bring the housing to an accurate new position, and means responsive to assumption by the housing of its accurate new position to move the second valve part in a straight line with respect to the first valve part for restoring the fluid lock between the vane and housing.

5. In combination, an angularly movable housing, a vane mounted in the housing for angular movement, means for supplying pressure fluid between the vane and housing to produce angular movement of the housing in one direction with respect to the vane, means for supplying pressure fluid between the vane and housing to produce angular movement of the housing with respect to the vane in the opposite direction, an angularly movable valve part and a reciprocal valve part cooperating with one another to block escape and entry of pressure fluid between the vane and housing by way of the aforesaid supplying means for providing a fluid lock between the vane and housing and thereby causing movement of the vane to a new position to bring the housing to an approximate new position, means connecting the angularly movable valve part to the vane for causing movement of the vane to its said position to move angularly the angularly movable valve part with respect to the reciprocal valve part for connecting one supplying means to a source of pressure fluid and the other supplying means to drain to move the housing to an accurate new position, and means responsive to assumption by the housing of the accurate new position to shift the reciprocal valve part in a straight line with respect to the angularly movable valve part for restoring the fluid lock between the housing and the vane.

6. In combination, an angularly movable housing member, an angularly movable vane member mounted in the housing member, means for supplying pressure fluid between the members to produce angular movement of one member in one direction with respect to the said other member, means for supplying pressure fluid between the members to produce angular movement of the said one member in the opposite direction with respect to the said other member, an angularly movable valve part and a reciprocal valve part cooperating with one another to block escape and entry of pressure fluid between the members by way of the aforesaid supplying means for providing a fluid lock between the members and thereby causing movement of the said other member to a new position to bring the said one member to an approximate new position, means connecting the said other member to the angularly movable valve part for causing movement of the said other member to its said position to move angularly the angularly movable valve part with respect to the reciprocal valve part for breaking the fluid lock and connecting one supplying means to a source of pressure fluid and the other supplying means to drain to move the said one member to bring it to an accurate new position, and means responsive to assumption by the said one member of the accurate new position to shift the reciprocal valve part in a straight line with respect to the angularly movable valve part for restoring the fluid lock between the members.

7. Apparatus for adjusting the valve of a condition, comprising a housing rotatable to produce various values of the condition, a vane rotatably mounted in the housing to various positions representing various values of the condition, means for moving the vane to a certain position representing a desired value of the condition, a rotatable valve part mounted in the vane for conjoint movement therewith about the axis of rotation of the vane and housing, a reciprocal valve part mounted in the rotatable part for movement with respect thereto along the aforesaid axis of rotation, means for supplying pressure fluid between the vane and housing for moving the housing with respect to the vane, the valve parts being so positioned upon start of the movement of the vane to its said certain position as to prevent entrance or exit of pressure fluid between the vane and housing by way of the supplying means and thereby to provide a fluid lock of the housing with respect to the vane causing movement of the vane to its said certain position to position the housing for approximately producing the desired value of the condition, the movement of the vane producing a movement of the rotatable valve part breaking the fluid lock between the vane and the housing and adjusting the housing for accurately producing the desired value of the condition, and condition-responsive means movable along the said axis of rotation and connected with the reciprocal valve part so as to restore the fluid lock between the vane and housing upon arrival of the desired value of the condition.

8. Apparatus for controlling the value of gas pressure, a housing rotatable to produce various values of gas pressure, a vane rotatably mounted in the housing to various positions representing various values of gas pressure, means for manually adjusting the vane to a certain position representing a desired value of gas pressure, a rotatable valve part mounted in the vane for conjoint movement therewith about the axis of rotation of the vane and housing, a reciprocal valve part mounted in the rotatable part for movement with respect thereto along the aforesaid axis of rotation, means for supplying pressure fluid between the vane and housing for moving the housing with respect to the vane, the valve parts being so positioned upon start of the movement of the vane to its said certain position as to prevent entrance or exit of pressure fluid between the vane and housing by way of the supplying means and thereby to provide a fluid lock of the housing with respect to the vane causing movement of the vane to its said certain position to position the housing for approximately producing the desired value of gas pressure, the movement of the vane producing a movement of the rotatable valve part breaking the fluid lock between the vane and the housing and adjusting the housing for accurately producing the desired value of gas pressure, an expansible-collapsible unit responsive to gas pressure so as to expand and collapse in the direction of the said axis of rotation, and means connecting the expansible-collapsible unit with the reciprocal valve for causing arrival of the desired value of gas pressure to shift the reciprocal valve with respect to the rotatable valve so as to restore the fluid lock between the vane and the housing.

9. In combination, an angularly movable housing, a vane angularly movable within the housing, means for supplying fluid under pressure between the vane and housing to produce angular movement of the housing with respect to the vane, an angularly movable valve part, a valve part having straight-line movement with respect to the angularly movable valve part and cooperating therewith to cause one relative position of the valve parts to produce a fluid lock of the housing and vane by trapping pressure fluid between the housing and vane and other relative positions of the valve parts to allow the pressure fluid to produce angular movement of the housing with respect to the vane in one direction or the other, means for angularly moving the vane to a new position and thereby causing the fluid lock between the vane and the housing to move the housing to an approximate new position, means connecting the vane and the angularly movable valve part to cause movement of the vane to its new position to move the angularly movable valve part with respect to the other valve part for breaking the fluid lock between the housing and the vane and allowing the pressure fluid to produce angular movement of the housing with respect to the vane to an accurate new position, and means responsive to assumption by the housing of its accurate new position to shift the valve part having straight-line movement with respect to the angularly movable valve part re-establishing the fluid lock between the vane and the housing.

10. In combination, an angularly movable outer valve part having an axial opening and two axially spaced parallel sets of helically arranged openings connecting the axial opening and the exterior of the outer valve part, and a linearly movable inner valve part fitting within the axial opening in the outer valve part and having a central opening and a helically arranged set of openings connecting the central opening and the exterior of the inner valve part and parallel spaced helical lands formed on the exterior of the inner valve part at opposite sides of the set of openings in the valve part so as to be adapted to cover the sets of openings in the outer valve part, whereby linear movement of the inner valve part in one direction or the opposite direction places the set of openings in the inner valve part in communication, respectively, with one set of openings in the outer valve part or with the other set, and angular movement of the outer valve part in one direction or the other will place, respectively, one set of openings in the outer valve part or the other set in communiaction with the set of openings in the inner valve part.

11. In combination, a first angularly shiftable member, a second angularly shiftable member, valve means including an angularly movable valve part and a linearly movable valve part cooperable with one another to cause one relative position of the valve parts to produce a lock of pressure fluid between the members and other relative positions to cause the pressure fluid to move the second member in one direction or the other with respect to the first member, angular shifting of the first member to a new position causing the fluid lock between the members to shift the second member angularly to an approximate new position, means connecting the angularly movable valve part and the first member for causing the aforesaid shifting thereof to shift the angularly movable valve part with respect to the linearly movable valve part and thereby to break the fluid lock between the members and to shift the second member to an accurate new position, and means responsive to assumption by the second member of the accurate new position for moving the linearly movable valve part with respect to the angularly movable valve part to restore the fluid lock between the members.

12. In combination, first and second members associated with one another so as to hold pressure fluid between them and being relatively movable, a rotatable valve part and a movable valve part cooperable with one another to cause one relative position of the valve parts to produce a fluid lock of the members to one another and other relative positions to cause the pressure fluid to move the second member in one direction or the other with respect to the first member, shifting of the first member to a new position causing the fluid lock between the members to shift the second member to an approximate new position, means connecting one valve part and the first member for causing the aforesaid shifting of the first member to shift the said one valve part with respect to the other valve part to break the fluid lock between the members and to adjust the second member to an accurate new position, and means responsive to assumption by the second member of the accurate new position for shifting the said other valve part with respect to the said one valve part to restore the fluid lock between the members.

13. In combination, an angularly shiftable housing, an angularly shiftable vane mounted in the housing, a rotatable valve part and a movable valve part cooperating with one another so as to cause the valve parts to be relatively positionable to establish a lock of pressure fluid between the housing and the vane and to be relatively positionable to adjust the housing with respect to the vane in one direction or the other, shifting of the vane to a new position causing the fluid lock to shift the housing to an approximate new position, means connecting the rotatable valve part and the vane for causing the aforesaid shifting of the vane to shift the rotatable valve part with respect to the movable valve part to break the fluid lock and to adjust the housing to an accurately new position, and means responsive to assumption by the housing of the accurate new position to shift the movable valve part with respect to the rotatable valve part for restoring the fluid lock between the vane and housing.

PAUL W. WYCKOFF.

REFERENCES CITED

The following references are of record in the file of this patent:

UNITED STATES PATENTS

| Number | Name | Date |
|---|---|---|
| 2,402,885 | Gilfillan | June 25, 1946 |
| 2,463,931 | Wyckoff | Mar. 8, 1949 |

FOREIGN PATENTS

| Number | Country | Date |
|---|---|---|
| 464,891 | Great Britain | Apr. 27, 1937 |

Certificate of Correction

Patent No. 2,521,557 September 5, 1950

PAUL W. WYCKOFF

It is hereby certified that error appears in the printed specification of the above numbered patent requiring correction as follows:

Column 9, line 20, for the word "valve" read *value*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*